United States Patent
Montague et al.

(10) Patent No.: US 8,596,727 B2
(45) Date of Patent: Dec. 3, 2013

(54) BICYCLE WHEEL ROTATIONAL FASTENING ASSEMBLY

(75) Inventors: David Montague, Newton, MA (US); Harry Montague, Brookline, MA (US)

(73) Assignee: Clix Systems, Inc., Cambridge, MA (US)

( * ) Notice: Subject to any disclaimer, the term of this patent is extended or adjusted under 35 U.S.C. 154(b) by 0 days.

(21) Appl. No.: 13/175,009

(22) Filed: Jul. 1, 2011

(65) Prior Publication Data
US 2011/0273002 A1 Nov. 10, 2011

Related U.S. Application Data

(63) Continuation of application No. 11/647,178, filed on Dec. 29, 2006, now abandoned.

(51) Int. Cl.
*B60B 27/00* (2006.01)

(52) U.S. Cl.
USPC .................................. 301/124.2; 280/279

(58) Field of Classification Search
USPC ................ 301/124.2; 411/427, 429, 435, 548
See application file for complete search history.

(56) References Cited

U.S. PATENT DOCUMENTS

| | | | | |
|---|---|---|---|---|
| 2,511,985 A | * | 6/1950 | Juy | 301/124.2 |
| 2,686,649 A | * | 8/1954 | De Vigier | 254/98 |
| 3,976,307 A | | 8/1976 | Ogisu | |
| 4,033,627 A | * | 7/1977 | Morroni | 301/124.2 |
| 4,079,958 A | | 3/1978 | Segawa | |
| 4,405,180 A | * | 9/1983 | Butz | 301/124.2 |
| 4,971,397 A | | 11/1990 | Nichols et al. | |
| 5,118,125 A | | 6/1992 | Plunkett | |
| 5,121,973 A | | 6/1992 | Phillips | |
| 5,165,762 A | | 11/1992 | Phillips | |
| 5,257,855 A | * | 11/1993 | Nagano | 301/110.5 |
| 5,338,142 A | | 8/1994 | Gonzales | |
| 5,549,315 A | | 8/1996 | Ashman | |
| 5,653,512 A | | 8/1997 | Phillips | |
| 6,004,064 A | | 12/1999 | Franz | |
| 6,089,675 A | | 7/2000 | Schlanger | |
| 6,276,760 B1 | | 8/2001 | Everett | |
| 2007/0052286 A1 | * | 3/2007 | Montague et al. | 301/124.2 |
| 2008/0157586 A1 | * | 7/2008 | Montague et al. | 301/124.2 |

FOREIGN PATENT DOCUMENTS

| | | |
|---|---|---|
| DE | 29714945 U1 | 10/1997 |
| EP | 1762480 A | 3/2007 |
| FR | 964622 A | 8/1950 |

* cited by examiner

*Primary Examiner* — Jason Bellinger
(74) *Attorney, Agent, or Firm* — Sughrue Mion, PLLC

(57) ABSTRACT

An assembly for the primary fastening of a bicycle or other wheeled vehicle wheel to wheel mount(s), as is commonly done by a cam operated quick release, incorporating a uniquely formed drawbar and a rotation handle wherein primary fastening is accomplished by simple rotation of the rotation handle about the drawbar axis.

21 Claims, 5 Drawing Sheets

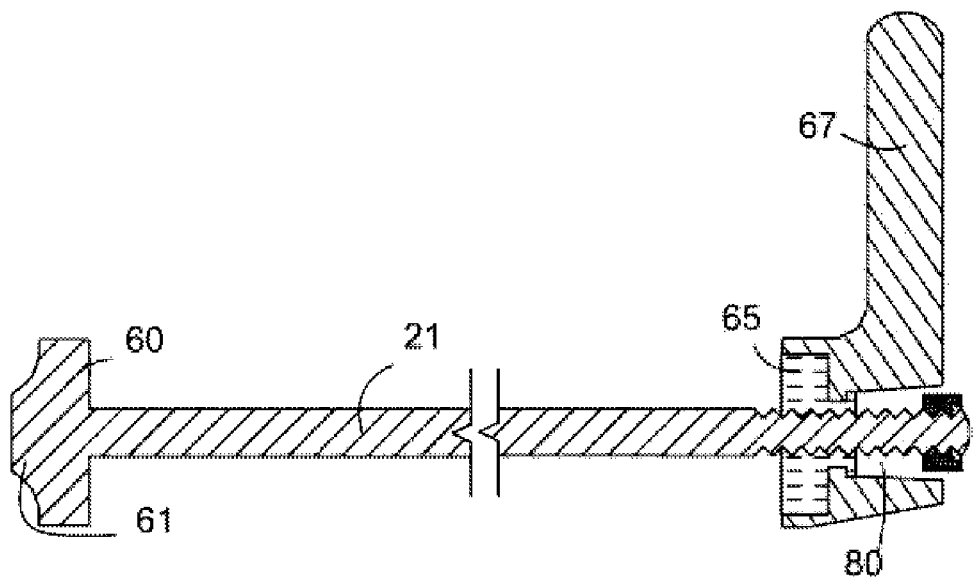
FIG. 1A.1
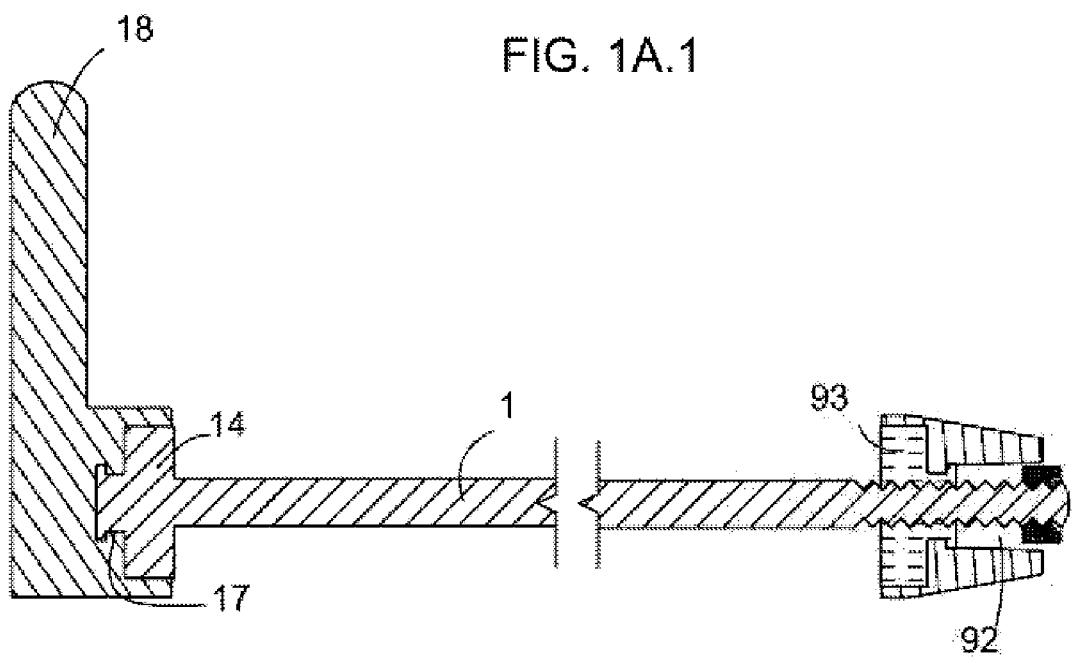
FIG. 1A.2

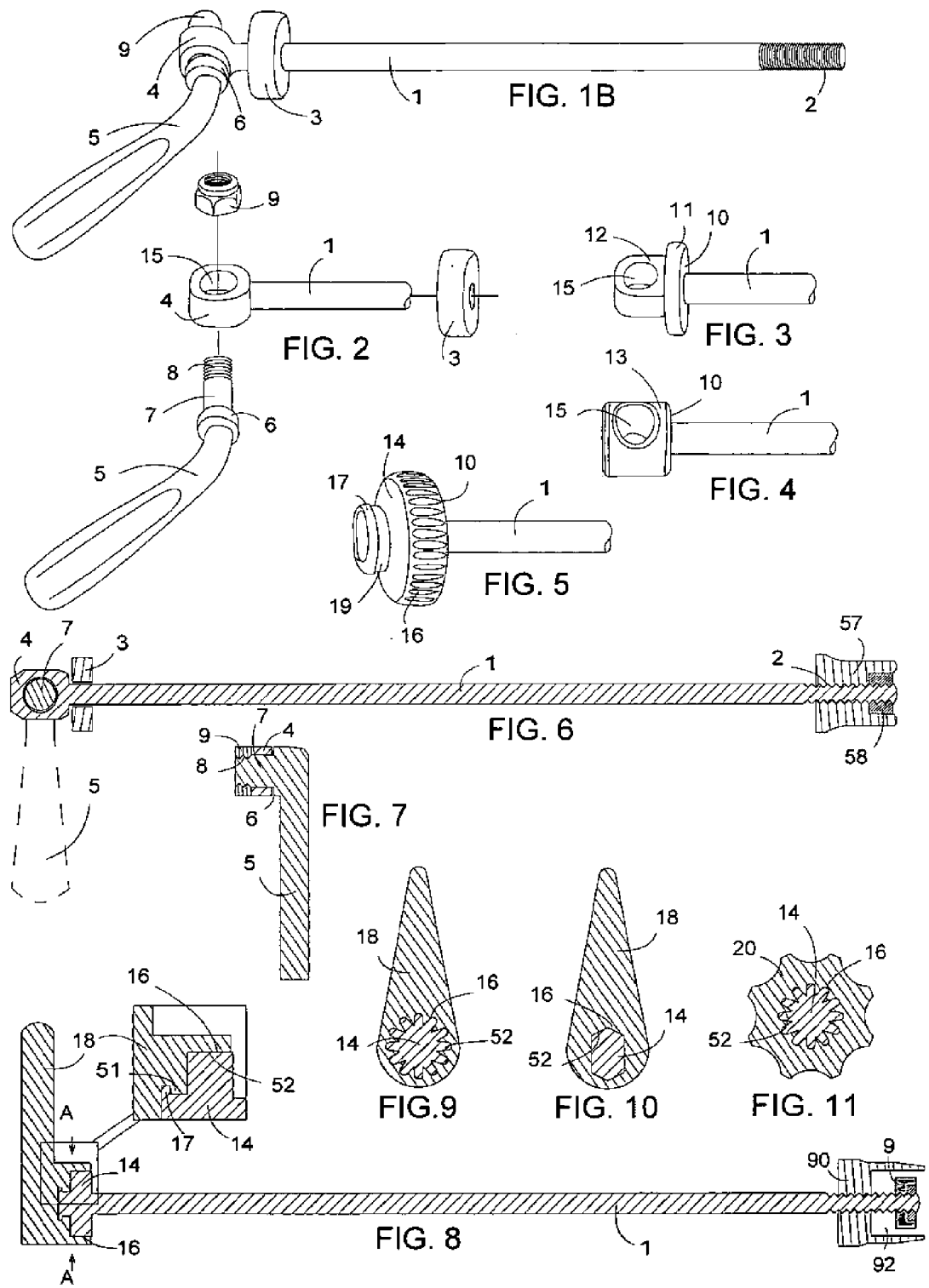

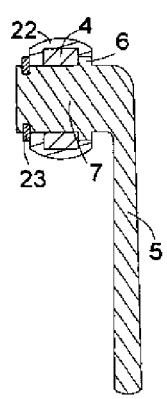 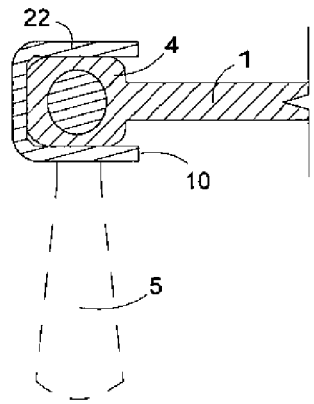 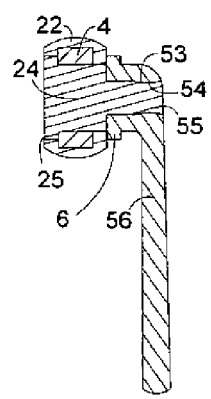 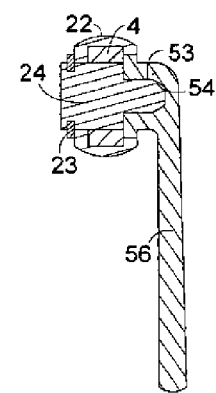
FIG. 13  FIG. 12  FIG. 14  FIG. 15
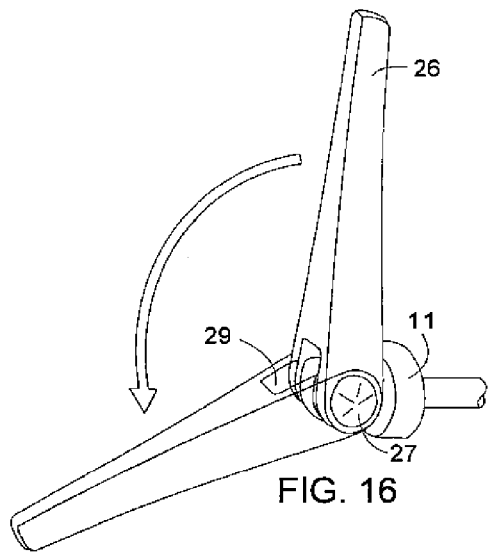 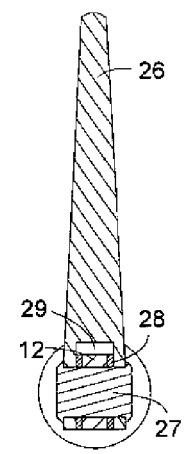 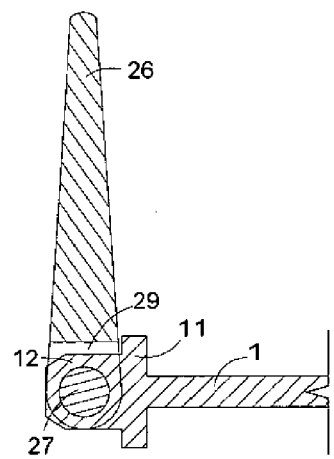
FIG. 16  FIG. 18  FIG. 17
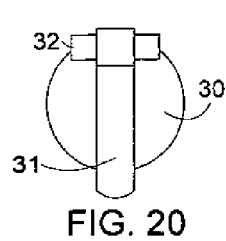 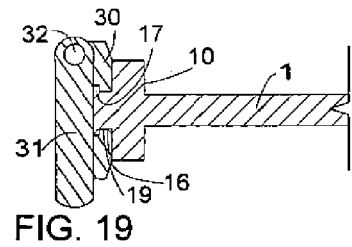
FIG. 20  FIG. 19

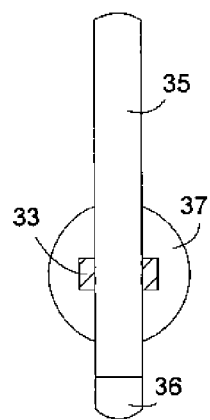
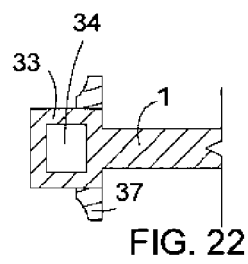
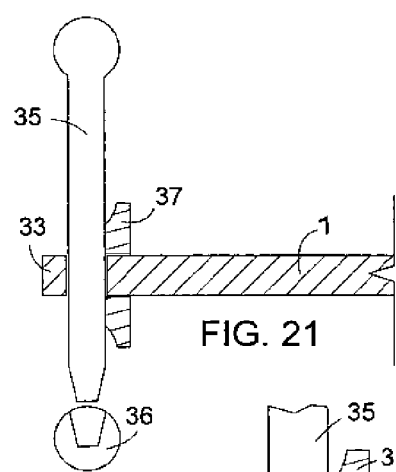
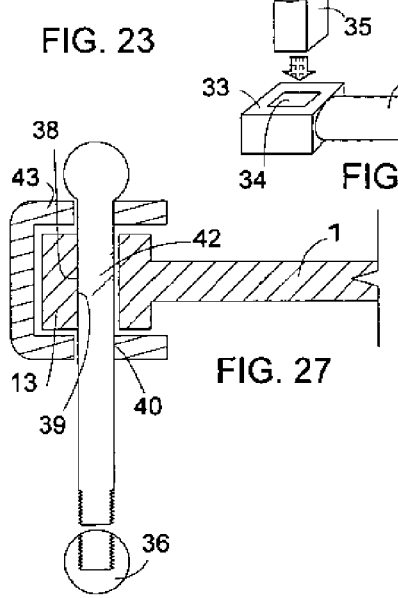
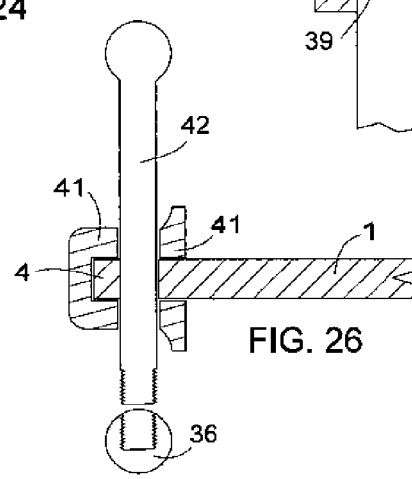
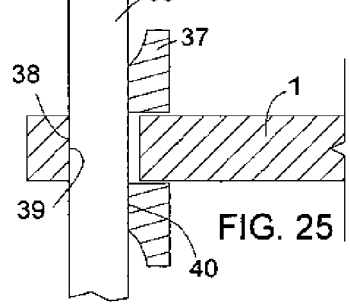
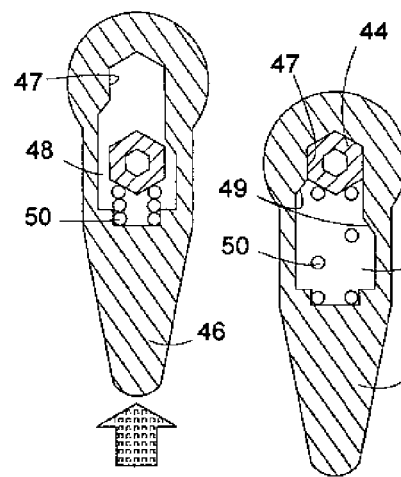
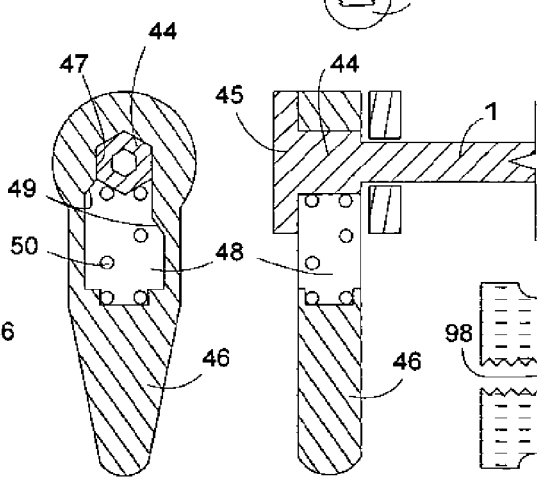
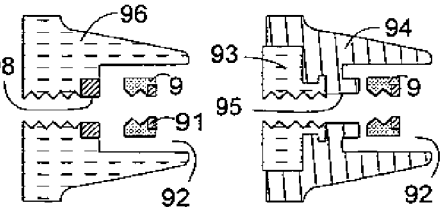
FIG. 23  FIG. 22  FIG. 21  FIG. 24  FIG. 25  FIG. 27  FIG. 26  FIG. 31  FIG. 30  FIG. 29  FIG. 28  FIG. 33  FIG. 32

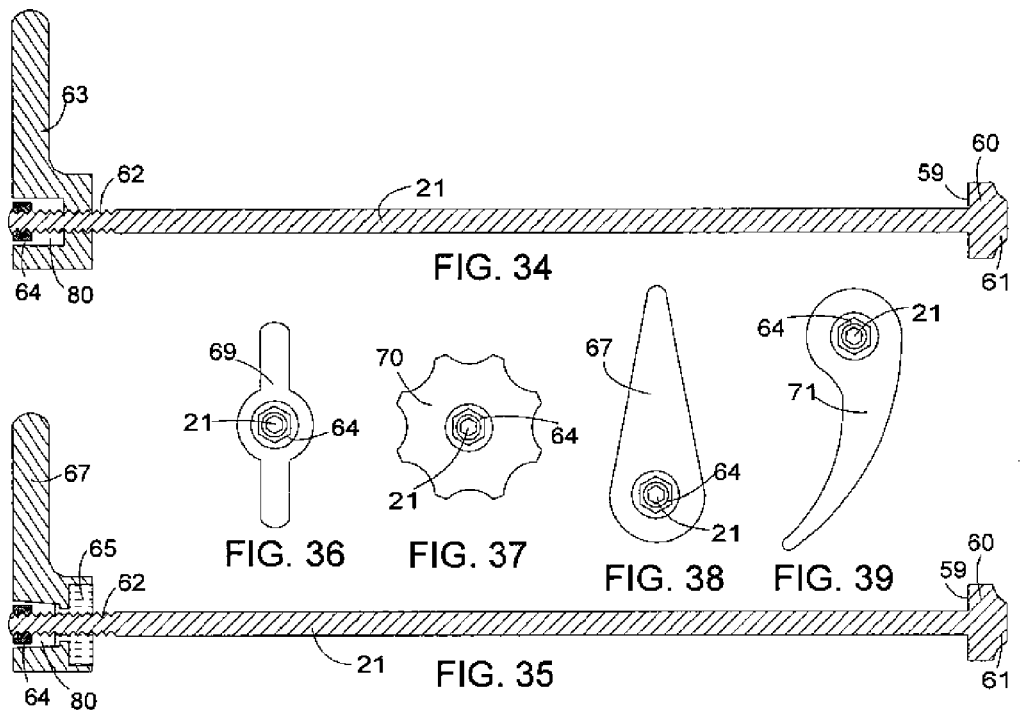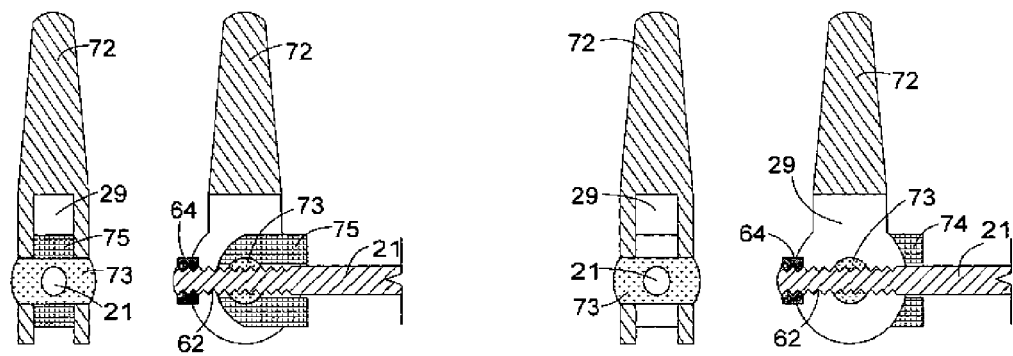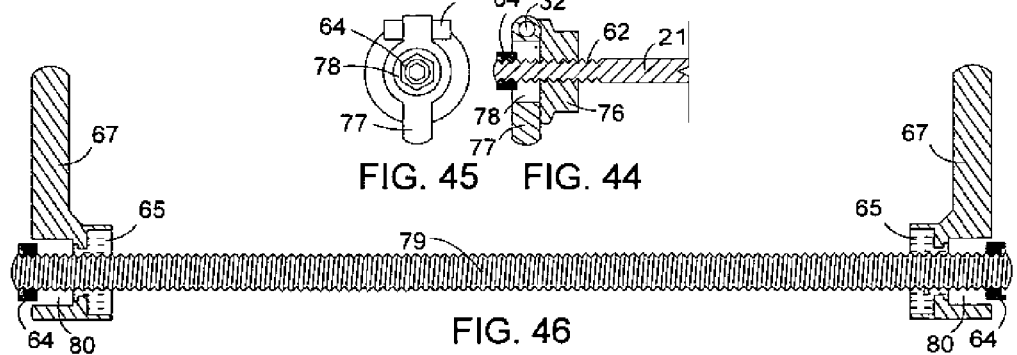

BICYCLE WHEEL ROTATIONAL FASTENING ASSEMBLY

CROSS REFERENCE TO RELATED APPLICATIONS

This is a Continuation Application of U.S. application Ser. No. 11/647,178 filed Dec. 29, 2006, the entire disclosure of which is hereby incorporated by reference.

BACKGROUND OF THE INVENTION

1. Field of the Invention

This invention relates in general to wheeled vehicles such as bicycles. In particular, this invention relates to the assembly of an apparatus for the primary fastening of a wheel axle to a wheel mount using a manual rotational tightening. This invention does not propose any secondary retention which may or may not be used in conjunction with the primary fastening system disclosed herein.

2. Description of Prior Art

Prior art for manually operated wheel fastening systems consists mostly of a variety of eccentric cam operated quick release levers. A drawbar is mounted concentrically inside a hollow hub axle and the quick release cam is mounted on one end, and the adjusting nut on the other end. The quick release cam, when locked, pulls the drawbar outward thereby pushing inward against the dropout as well as causing the adjusting nut to push inward on the opposite dropout. In this way, the wheel mounts are clamped between the quick release cam and the hub on one side of the hub, and between the adjusting nut and the hub on the other side of the hub thereby fastening the wheel.

In most cases, the wheel mounts, or dropouts, are configured with a recessed surface, or a set of safety tabs, such that the operation of the cam quick release on its own is not sufficient to allow for wheel removal. Therefore when re-installing the wheel, the operator must perform the iterative process of locating the adjusting nut in the exact position for correct cam operation using rotation, then operating the eccentric cam by flipping the lever over the top of the cam in a different orientation from the rotation to finally fasten the wheel.

This process is not fully understood by many operators. Most operators can understand a cam lever that needs to flip over the top for locking. Likewise, most operators can understand simply rotating a lever until tight. However, the combination of the two is often not done properly and can lead to unwanted wheel separation.

It would therefore be preferable to allow for wheel removal by the simple operation of a quick release cam with no re-adjusting required of the adjusting nut as set forth in U.S. Published document 2007/0052286 (Montague). Separately, it would also be preferable to allow for wheel removal by the simple rotation of a lever or knob until tight.

There are several examples of prior art where the operation of the eccentric cam is the only method needed to fasten the wheel. There have been very few systems which are simply manually turned to tighten for locking.

U.S. Pat. No. 6,089,675 (Schlanger) discloses an invention wherein the wheel is attached to a more traditional slotted wheel mount on one side and a unique threaded hole on the other wheel mount. Also shown are a variety of knob or lever operated fastening systems where the wheel is fastened by, in most cases, rotating a lever or knob until tight. Embodiments shown generally have a knob or lever on one side of the wheel, and the bicycle frame or fork on the other side is threaded to accept a threaded drawbar. In several embodiments, a nut is used which is mounted to the dropout in a rotationally fixed manner. Most embodiments require the use of a non-traditional fork for correct function of the primary locking system. Furthermore, in the locked position, the lever or knob is never adjustable to a specific orientation (such as parallel to a fork blade) as is common on today's bicycles. This adjustable orientation is important for a lever as passing branches and other objects may catch on a forward facing lever. Schlanger generally outlines the method of attachment of the wheel to the bike while the invention disclosed herein generally outlines the method of attachment between a turn handle and the drawbar.

U.S. Pat. No. 4,079,958 (Segawa) discloses an invention using a wing nut which is threaded onto a drawbar and the system is operated by rotation of the wing nut. The drawbar is threaded at both ends and an adjusting nut is mounted on the opposite end. While the invention disclosed herein outlines a method of fastening the handle or distal nut relative to the drawbar in a rotationally-fixed manner, Segawa does not fix any element rotationally to the drawbar.

As used herein, the term "drawbar" is also known in the industry as a "skewer", "spindle", "connecting rod", "control shaft" and "retaining rod". Also the word "handle" is used to denote a variety of "levers", "knobs", and "wing nuts".

SUMMARY OF THE INVENTION

One objective of the present invention is to provide a safe manually operated primary wheel fastening system that is intuitive to operate by the inexperienced rider with no instructions. Many bicycles are sold today using a quick release cam system that must be adjusted to an exact position each time the wheel is installed.

Another objective of the present invention is to provide a system wherein primary fastening is accomplished by simple rotation of a lever. The average user can understand the simple turning of a lever or wing nut without reading manuals or instructions.

Another objective of the present invention is to provide a system where applying a substantial torque to the handle won't inadvertently break the system. Users are known to stand on a lever with the full weight of their person to force it in a particular direction. Therefore, when using a turn-to-tighten system, rotation-fixing mounting of the handle using threading with thread lock glue is not desirable. As outlined in the present invention, an integrally formed drawbar member which allows for the non-rotational mounting of a handle, and does not rely on thread-locking glue to prevent the system from breaking, is preferable. Alternatively, a handle which is mounted to the drawbar by threading, and is designed to thread up and down the drawbar for tightening and loosening is desirable.

Another objective of the present invention is to provide a system that is light weight, simple, and inexpensive to manufacture. Allowing for various components to be manufactured separately, then inseparably connected together makes a system that utilizes the correct material in the correct location with little excess or waste. This results in a lighter weight, and a lower cost assembly.

Another objective of the present invention is to provide a system wherein the handle or lever can be rotated or articulated to an orientation facing rearward during riding. This is accomplished by always having the drawbar and distal nut rotatable relative to the wheel mounts thereby allowing the handle or lever to be orientated as desired.

Another objective of the present invention is to provide a system wherein the wheel can be changed to another bicycle or wheeled vehicle without disturbing any pre-set condition which is difficult for some users to re-set. The present invention does not have a pre-set condition that must be altered when the wheel is removed from the wheel mounts and therefore a wheel equipped with the present invention is easily and readily interchangeable with other bicycles or vehicles.

Another objective of the present invention is to provide a system compatible with current and standard bicycle forks. The present invention works with all current standard bicycle forks.

Another objective of the present invention is to provide a system compatible with currently available secondary retention systems. Systems which spring load the drawbar in the direction of the handle end and, on the distal end, use a knurled nut or knurled integral drawbar member which resists rotation relative to the adjacent wheel mount, allow the user to rotate the handle for tightening without holding the opposite end. In this way, the system may be operated from only one side of the bicycle or vehicle.

Another objective of the present invention is to provide a system which is easily assembled by the retailer with little or no direction for the assembly person.

The above objectives, as well as other objectives, advantages, and features, will be met in the following descriptions and illustrations which outline the present invention.

BRIEF DESCRIPTION OF THE DRAWINGS

FIG. 1A.1 is a cross-section side view of a drawbar with an integrated lever base in accordance with one embodiment of this invention.

FIG. 1A.2 is a cross-section side view of drawbar with an integrated lever base as a variant of FIG. 1A.1, in accordance with one embodiment of this invention.

FIG. 1B is a perspective of a turn to tighten wheel fastening system with a drawbar with integrated lever fastening base and a side lever.

FIG. 2 is an exploded perspective view of FIG. 1B.

FIG. 3 is a perspective of a drawbar with a flat integrated articulating lever base with integrated ring.

FIG. 4 is a perspective of a drawbar with an integrated round articulating lever base.

FIG. 5 is a perspective of a drawbar with an integrated lever base for non-articulating levers.

FIG. 6 is a cross-section side view of FIG. 1B.

FIG. 7 is a cross-section top view of the lever shown in FIG. 6.

FIG. 8 is a cross-section side view of a drawbar with integrated lever base with a press-on non-articulating lever.

FIG. 9 is a cross-section top view of FIG. 8 section A-A.

FIG. 10 is a cross-section top view of a non-articulating lever and drawbar lever base.

FIG. 11 is a cross-section top view of a non-articulating knob and drawbar lever base.

FIG. 12 is a cross-section side view of a drawbar with integrated lever base with a articulating lever and housing.

FIG. 13 is a cross-section top view of FIG. 12 with a monolithic lever.

FIG. 14 is a cross-section top view of FIG. 12 with a press-fit lever.

FIG. 15 is a cross-section top view of FIG. 12 with an alternative press-fit lever.

FIG. 16 is a perspective view of a drawbar with integrated lever base and center mounted articulating lever.

FIG. 17 is a cross-section side view of FIG. 16.

FIG. 18 is a cross-section top view of FIG. 16.

FIG. 19 is a cross-section side view of a drawbar with integrated lever base and press-fit articulating recessed lever.

FIG. 20 is a top view of FIG. 19.

FIG. 21 is a cross-section side view of a drawbar with integrated lever base, a push-through lever, and a pressure washer.

FIG. 22 is a cross-section side view of the drawbar of FIG. 21 shown at 90 degrees to FIG. 21.

FIG. 23 is a cross-section top view of FIG. 21.

FIG. 24 is a perspective of the drawbar and integrated lever base of FIG. 21

FIG. 25 is an enlarged view of FIG. 21 in the fastened position.

FIG. 26 is a cross-section side view of a drawbar with integrated flat lever base, a push-through round lever, and a housing.

FIG. 27 is a cross-section side view of a drawbar with integrated round lever base, a push-through round lever, and a housing.

FIG. 28 is a cross-section side view of a drawbar with integrated lever base, and a position adjustable lever.

FIG. 29 is a cross-section top view of FIG. 28.

FIG. 30 is a cross-section top view of FIG. 28 depressed for lever positioning.

FIG. 31 is a cross-section side view of a two piece adjusting nut with a hollow area for housing a locking/stopping nut.

FIG. 32 is a cross-section side view of a one piece adjusting nut with a hollow area for housing a locking/stopping nut.

FIG. 33 is a cross-section side view of an adjusting nut with a hollow area for housing a locking/stopping nut and a surface which resists rotation. One piece and two piece constructions are shown.

FIG. 34 is a cross-section side view of a drawbar with integrated adjusting nut and threaded area for mounting a non-articulating lever, a lever, and a retaining member.

FIG. 35 is a cross-section side view of a drawbar with integrated adjusting nut and threaded area for mounting a non-articulating lever, a two piece press-fit lever, and a retaining member.

FIG. 36 is a top view of a wing nut balanced lever and retaining member.

FIG. 37 is a top view of a knob and retaining member.

FIG. 38 is a top view of a lever and retaining member.

FIG. 39 is a top view of a non-symmetrical lever and retaining member.

FIG. 40 is a cross-section side view of a drawbar threaded area and mounted articulating turn to tighten lever, a pin, a base washer, and retaining member.

FIG. 41 is a cross-section top view of FIG. 40.

FIG. 42 is a cross-section side view of a drawbar threaded area and mounted articulating turn to tighten lever, a pin, a base washer, and retaining member.

FIG. 43 is a cross-section top view of FIG. 42.

FIG. 44 is a cross-section side view of a drawbar threaded area and mounted articulating recessed lever, and retaining member.

FIG. 45 is a top view of FIG. 44.

FIG. 46 is a cross-section side view of a non-hollow axle with press-fit levers and retaining members at each end.

DETAILED DESCRIPTION OF THE PREFERRED EMBODIMENTS

The following is a detailed description of the preferred embodiments of the present invention. The illustrations and descriptions of the preferred embodiments provided herein should not be considered limiting of the invention as defined by the claims and their equivalents. It is apparent to those skilled in the art that any number of modifications can be made to the present invention and any such modification shall fall within the present invention even if not specifically shown.

FIGS. 1A through 45 show embodiments wherein a drawbar is threaded on one end and is equipped with an integrally formed drawbar member on the other end. Both ends of the drawbar, in all embodiments shown, are rotatable relative to their proximal wheel mount surfaces, however, they may be equipped with means to resist but not prevent rotation. In some cases, members shown will not be directly adjacent to the wheel mounts as a secondary retention system may be used in conjunction with the present invention however none are shown. The result of incorporating certain secondary retention systems would, in some cases, allow for means to resist but not prevent rotation of the non-lever side member. In this way, wheel removal and re-installation could be accomplished by operations on only one side of the wheel/bicycle. It is often desirable to orient a quick release or other wheel fastening lever in a rearward direction. The ability to rotate the turning handle of the present invention relative to the wheel mounts allows the handle, in the locked position or almost locked position, to be rotated and oriented in a desired direction away from the front of the bicycle or vehicle so that it would be less likely to catch on passing branches or other obstacles. The different parts of a bicycle or other vehicle including the wheel mounts, hub, axle, bearings, etc. are well known in the bicycle art, and are therefore not shown in the illustrations and minimally discussed in the descriptions.

FIGS. 1B through 33 show embodiments wherein the integrally formed drawbar member is used to fasten a primary locking lever or knob, while the drawbar threaded end is used to fix a threaded nut or nuts. FIGS. 34 through 45 show embodiments wherein the drawbar threaded section is used to fasten a threaded lever or knob, or member holding a lever or knob, while the integrally formed drawbar member on the opposite end is used to apply pressure to the adjacent dropout or to a secondary retention member. It is possible to also include handles on both sides of the wheel, or on neither side. FIG. 46 shows that any of the handles, levers, or knobs, or their attachment bases shown, can be incorporated on both ends of a non-hollow axle wheel hub without departure from this invention.

Referring now to FIG. 1B, a drawbar 1 is shown with threaded end 2, and an asymmetrical integral drawbar member 4 which serves as the base for a side throw articulating monolithic lever 5 which includes blocking ring 6, shank 7, and threaded end 8, which mounts locking nut 9 to hold the lever in place. As lever 5 is rotated about the drawbar axis, a nut threads on drawbar threaded end 2, and washer 3 pushes against member 4 and/or the bottom edge of blocking ring 6 and locking nut 9 which can cause lever 5 to resist articulating rotation. FIG. 2 shows an expanded view of FIG. 1B wherein drawbar member hole 15 allows mounting of lever 5. Fastening the primary locking system for riding is accomplished by simple rotation of lever 5 about the drawbar 1 axis until the adjusting nut (shown in FIG. 31 through 33) is tightened. In some cases, it may be desirable to make lever 5 out of a lighter, and possibly softer material such as aluminum or nylon. In this case, locking nut 9 could include a sleeve which protrudes inside drawbar member 4 to protect shank 7. Not shown is the hub, wheel mounts, and any secondary retention member which are compressed between washer 3 and nut 90.

FIGS. 3 through 5 show variations of the integral drawbar member. FIG. 3 shows a drawbar 1 with an integral drawbar member which incorporates integrated washer 11 with flat integrated articulating lever base 12 with drawbar member hole 15. Washer pressure area 10 is the surface that supplies the fastening force to the wheel mount or secondary retention. The configuration shown in FIG. 3 can allow the articulating lever to swing freely, or the lever can be made to have constant pressure against integrated washer 11, or be fitted with washers or other means, thereby making the lever resistant to articulating. FIG. 4 shows a drawbar 1 with a round integrated articulating lever base 13, with drawbar member hole 15, and pressure area 10. This round lever base is typically used with a housing covering it. FIG. 5 shows a drawbar 1 with a integrated lever base 14. Lever base non-rotational or splined surface 16 causes the rotation of an affixed lever to force drawbar 1 to rotate. Press-fit lever retainer 17 and lever base press-fit gap 19 serve to retain a pressed on lever on lever base 14.

FIG. 6 shows a cross-section side view of the embodiment shown in FIG. 1 further equipped with a standard adjusting nut 57 with turn-resistant nylon 58. FIG. 7 shows a cross-section top view through the middle of side throw monolithic lever 5 of the embodiment shown in FIG. 1B.

FIGS. 8 through 11 show an assembly and several variations. The handles 18 and 20, and the integrated drawbar member 14 are manufactured separately and possibly of differing materials, but they are inseparably connected to be rotatable as one. Thus, the integrated drawbar member 14 may be made of one material and have a fixed shape for use in combination with a variety of knobs or levers made of a different material, and having different shapes. FIG. 8 shows a drawbar 1 with an integral drawbar member 14, with non-rotational or splined surface 16, which marries with lever splined surface 52 to avoid relative rotation. Lever 18 is prevented from separating from integral drawbar member 14 by press-fit lever retainer 17 and press-fit holding ring 51. Adjusting nut 90 with cavity 92 applies fastening pressure at the distal end of the drawbar. FIG. 9 shows a cross-section top view of the lever 18 and integral drawbar member 14. FIG. 10 shows a lever surface 52 which uses one of a wide variety of possible shapes to prevent relative rotation to the integral drawbar member 14. FIG. 11 shows a knob 20 mounted on integral drawbar member 14. Not shown, but obvious to those skilled in the trade are a wide variety of methods to hold a separately formed handle from separating from the integrally formed drawbar member including simply bolting on the handle. Also not show are a wide variety of shapes and methods which could be employed to prevent relative rotation between the handle and the integral drawbar member as well as a wide variety of handle configurations.

In some cases is may be preferable to have a housing covering the drawbar end to prevent mud and dirt from entering. FIGS. 12 through 15 show a covered system which uses asymmetrical integral drawbar member 4. For simplicity of illustration, the distal nut has been excluded. As shown in FIG. 12, drawbar 1 with integral drawbar member 4 is covered by housing 22. Lever 5 is freely articulated through approximately 180 degrees to avoid wheel mounts during axial rotation of drawbar 1 for wheel fastening. However, when the locking system is tightened, and pressure area 10 presses against either a wheel mount, or a secondary retention system, then lever 5 becomes increasing more difficult to articulate. Note, while FIG. 12 appears to be a traditional quick release cam mechanism, it is not. There is no cam included and it is therefore possible to manufacture FIG. 12 in a considerably smaller size and weight. In fact, monolithic lever 5 could be manufactured at a right angle to the orientation shown, such that it is parallel and in line with shank 7 in FIG. 13. In FIG. 13 shank 7 is shown as integral to lever 5, and held in place by end retainer 23 and blocking ring 6. Blocking ring 6 may also be configured to limit the articulation of lever 5, often to approximately 180 degrees, so that lever 5 is not able to rotate into passing spokes or rims of the adjacent wheel or hub. In FIG. 14 however, center shank 24 and attaching lever 56 are manufactured separately and possibly of differing materials, but they are inseparably connected to be rotatable as one. Thus, the shank 24 may be made of one material and have a fixed shape for use in combination with a variety of levers made of a different material, and having different shapes. Again, blocking ring 6 can be used to limit articulation such that the lever cannot enter the wheel area and cause a dangerous situation. Center shank blocking ring 25 and lever 56 hold the assembly captive inside housing 22 while center shank spline area 53 and lever spline area 54 hold lever 56 from coming off the end, and from rotating about lever press-fit area 55. There are a wide variety of methods for fastening a shank to a lever, which will not be discussed but which are obvious to those skilled in the trade. However, FIG. 15 shows one alternative which uses a spline 53. Also not shown, but obvious to those skilled in the trade are a wide variety of round housing configurations used with round integrated articulating lever base 13.

FIGS. 16 through 18 show an embodiment which employs a drawbar 1 with a flat integrated articulating lever base 12, and an articulating lever 26, with a lever inside cut 29, and a rotation pin 27. Unlike the configuration shown in FIG. 12, lever 26 articulates freely regardless of whether the wheel is clamped for riding. This configuration uses optional rotation lever friction washer 28 to resist unwanted articulation of the lever, or it can be made such that the base end of articulating lever 26 presses against integrated washer 11 causing frictional resistance to articulation. Lever 26 is freely articulated through approximately 180 degrees to avoid contacting wheel mounts during axial rotation of drawbar 1 for wheel fastening. Again, this assembly may appear similar to a cam quick release, but no offset cam is present and simple rotation about the drawbar axis is all that is required to fasten the wheel.

Referring now to FIGS. 19 and 20, drawbar 1 is shown fitted with a recessed lever housing 30, on which mounts a recessed lever 31, rotatably connected by recessed lever rotation pin 32, wherein the assembly is connect in a rotation-fixing manner to drawbar 1 by press-fit lever retainer 17 and a combined lever base press-fit gap 19 and lever base non-rotational surface 16.

FIGS. 21 through 25 outline an embodiment where the integral drawbar member consists of a lever base non-round loop 33 with non-round hole 34, through which is mounted a non-round push through lever 35 with a lever end cap 36. As the push through lever 35 is rotated tightening the adjusting nut (not shown), and pulling on drawbar 1, lever top pressure area 38 pushes against inside pressure surface 39 causing push through lever 35 pressure area 40 (see FIG. 25) to push down on pressure washer 37 which is in turn forced against the wheel mount or secondary retention system (not shown). In this way, the push through lever 35 can be pushed through to avoid contacting wheel mounts during turning for fastening, but is fixed from further motion once the wheel is secured. A round push-through lever 42 may be desirable, which is used in conjunction with housing 41 and an asymmetrical integral drawbar member 4 (as shown in FIG. 26) or with a housing 43 and a round articulating lever base 13 as shown in FIG. 27. In most cases, the pressure washer is shaped to correspond with the shape of the push through lever.

FIGS. 28 through 30 outline an embodiment wherein a lever is tightened by rotation until the wheel is fastened for riding, then depressed and rotated into an orientation desirable for riding such as in a rearward facing manner, or in a manner parallel to the wheel mounts such that passing branches or other object will not catch on the lever. Drawbar 1 comprises a shaped area 44 and a pressure cap 45 which retain push-in lever 46 and prevent relative rotation between shaped area 44 and push-in lever 46 using rotation preventing surface 47. Spring 50 encourages push-in lever 46 to remain engaged with rotation preventing surface 47 until a force is applied depressing spring 50, allowing shaped area 44 to enter rotation free area 48, at which point the lever may rotate relative to drawbar 1. Shaped area 44 is re-aligned by lever aligning surfaces 49 when the lever is no longer depressed. It may be preferable to manufacture pressure cap 45 separately from shaped area 44.

Referring now to FIGS. 31 through 33, all the preceding embodiments have incorporated some form of adjusting nut which threads up and down drawbar threaded end 2. Several of the variations of adjusting nuts are shown and, depending on the secondary retention system used (or not) in conjunction with a particular embodiment, different adjusting nuts are also considered. All adjusting nuts (as well as the corresponding component on the handle end) may incorporate a knurled surface (not shown) if anti-rotational friction is desired. FIG. 31 shows a threaded base 93 covered by a cover 96 cavity 92. FIG. 32 shows a one piece adjusting nut 90 and the cavity 92 for housing a locking nut 9 with rotation resistant nylon 91 or other means to prevent an adjusting nut from threading off the end of the drawbar. FIG. 33 shows two variations of an adjusting nut with cavity 92 wherein on one threaded base 93 and contoured cover 94 are manufactured separately but are then inseparably connected to be rotatable together using well know methods. Optionally shown is a single piece nut 96. Contoured cover 94 includes rotation resistant section 95 which acts to resist rotation against drawbar 1. Similarly, single piece nut 96 houses anti-rotation member 98 to resist rotation. The adjusting nuts shown in FIG. 32 and FIG. 33 are novel, and provide a utility that could be beneficial to a wide variety of wheel fastening systems. Therefore it is found that these novel nuts can be used in conjunction with the invention disclosed herein as well as many other wheel fastening systems included those shown in U.S. Published document 2007/0052286 (Montague).

All embodiments considered thus far have mounted the primary handle on the integrated drawbar member while using an adjusting nut on the threaded end of the drawbar. Therefore as the handle is rotated to tighten, the drawbar 1 also rotates. If however the direction is switched and the handle is mounted on the drawbar threaded end, and the integral drawbar member is used to replace the adjusting nut, then when the handle is rotated to tighten, the drawbar does not rotate. This configuration is illustrated in FIGS. 34 through 44. Most handles outlined in FIGS. 1B through 33 could be mounted on a threaded member as shown in FIGS. 34 through 46 and are not shown for purposes of brevity.

Referring now to FIG. 34, integrated distal nut 60, with finger turning area 61 may have a knurled surface 59 to resist drawbar 21 axial rotation. Drawbar threading 62 is used to thread monolithic threaded lever 63 for fastening of the wheel, and retaining nut 64 is housed in retaining nut cavity 80 and prevents lever 63 from threading off the end of drawbar 21. This embodiment is desirable as it contains very few separate pieces.

The embodiment shown in FIG. 35 is similar to that shown in FIG. 34 however the handle is a two part handle where threaded press-fit lever base 65 is fitted with press-fit lever 67. Like other embodiments shown herein, press-fit lever base 65 and press-fit lever 67 are manufactured separately and possibly of differing materials, but they are inseparably connected to be rotatable as one. Thus, press-fit lever base 65 may be made of one material and have a fixed shape for use in combination with a variety of levers made of a different material, and having different shapes. The method of connecting press-fit lever base 65 and press-fit lever 67 has been discussed in other sections of this invention such as FIG. 8 and therefore will not be repeated here. There are a wide variety of methods for fastening a lever base to a lever, which will not be discussed but which are obvious to those skilled in the trade. FIGS. 36 through 39 show a variety of handles compatible with FIG. 34 and FIG. 35 such as wing nut 69, knob 70, and non-symmetrical lever 71. These handles are non-articulating, and therefore, if a particular orientation of the handle in the locked position is desired, such as in a direction facing toward the rear of the vehicle so as to not catch on a passing branch or other object, then integrated distal nut 60 is simply rotated prior to the handle reaching the locked position.

While a non-articulating lever may be desired such as those shown in FIGS. 34 through 39, an articulating lever such as those shown in FIGS. 40 through 45 may also be desired. For clarity, the drawbar integrated distal nut 60 has been removed from the illustrations. FIGS. 40 and 41 show an articulating lever 72, with lever inside cut 29, mounted for articulating rotation about threaded pin 73, on drawbar 21. When articulating lever 72 is rotated about drawbar 21 to fasten the wheel, it applies pressure on follower ring 74 which in turn applies pressure on the wheel mount or secondary retention system (not shown). Retaining nut 64 prevents threaded pin 73 from threading along drawbar threading 62 off the end. The portion of articulating lever 72 which contacts follower ring 74 may be laterally flat as shown in FIG. 41, or may be laterally chamfered such that follower ring 74 takes the corresponding shape of a bowl instead of a half-pipe. This embodiment again allows the lever 72 to lock into place with no further articulation once the wheel is fastened for riding. FIGS. 42 and 43 show a similar articulating lever 72 mounted on a follower ring 75 which is itself pressing against threaded pin 73. In this case, articulating lever 72 is not part of the force flow and would use alternate means to prevent movement during riding.

FIGS. 44 and 45 outline an embodiment wherein threaded recess lever housing 76 is mounted on drawbar 21 and houses spread lever 77 which is bisected by spread lever hole 78 which allows retaining nut 64 and drawbar 21 to pass through.

Many of the handle configurations shown herein can be transferred such that, in combination with a solid axle, they could be used on both ends of solid axle 79 to secure a wheel to wheel mounts. Referring now to FIG. 46, retaining nut 64 would then prevent any of the handles outlined herein from threading off the end of the axle. The invention disclosed herein is applicable to all wheels, front and rear, left and right, on wheeled vehicles. In addition, while most wheels are mounted between two wheel mounts, the invention disclosed herein is applicable to systems utilizing a single wheel mount on one side of the wheel.

It is obvious to those skilled in the trade that any one of the integral drawbar members or handle assemblies disclosed may be manufactured separately in multiple pieces and assembled into an integral but inseparably connected component with a function equal to those disclosed herein and should be considered within the overall scope of this invention.

While this invention has been described in the context of a number of preferred embodiments, it will be apparent to those skilled in the trade that based on this disclosure modifications of the embodiments may be effectuated but are still within the overall scope of this invention. No attempt has been made to exhaust the realm of possibilities, but rather to disclose the essential aspects of this invention.

What is claimed is:

1. An assembly for fixing a wheel to wheel mounts used in connection with a hub and a hollow axle comprising; a handle, and a drawbar, said drawbar mounted concentrically in said hollow axle and having a first end and a second end, said handle mounted to said first end of said drawbar, said second end configured with a second member, a friction washer mounted between said drawbar and said handle such that the operation of said repositioning movement is not affected by the state of said primary clamping, wherein primary clamping of the wheel mounts to the wheel is effectuated by the rotation of said handle around the drawbar axis relative to said second member and wherein after primary clamping is completed, said handle is configured for repositioning relative to said drawbar by movement in a direction other than longitudinally along said drawbar's axis to allow for the repositioning of said handle to a position desired during the usage of said wheel.

2. The assembly of claim 1 wherein said repositioning movement at least partially comprises rotation of said handle about an axis other than the drawbar axis.

3. The assembly of claim 1 wherein said repositioning movement at least partially comprises rotation of said handle about the drawbar axis.

4. The assembly of claim 3 wherein said repositioning movement at least partially consists of movement of said handle in a direction approximately perpendicular to said drawbar axis.

5. The assembly of claim 1 wherein said handle, in a first position, is engaged and effectuates the primary clamping of said wheel mounts to the wheel, and in a second position, is not engaged to cause the primary clamping of the wheel mounts to the wheel.

6. The assembly of claim 1 wherein said handle is mounted to said drawbar and is engaged to cause the primary clamping of the wheel mounts to the wheel in all repositioning positions.

7. The assembly of claim 1 wherein said first end of said drawbar has an end portion with a hole positioned at a generally right angle to said drawbar axis.

8. The assembly of claim 7 further comprising a pin mounted in said hole and said handle is mounted on said pin in said hole.

9. The assembly of claim 7 wherein a portion of said handle is mounted in said hole.

10. The assembly of claim 7 wherein said handle has a cutout to pivot about said end portion wherein said pivot allows for said repositioning of said handle.

11. The assembly of claim 7 wherein said handle has a cutout to accommodate said end portion of said drawbar and a through hole aligned with said hole in said end portion.

12. The assembly of claim 11 further comprising a mounting pin passing through said through hole and said hole.

13. The assembly of claim 5 wherein said handle is biased to the engaged position to effectuate primary clamping.

14. The assembly of claim 1 wherein said second end of said drawbar is threaded and wherein said second member is threaded on said second end, and wherein said assembly further comprises means to stop said second member from unwinding off the end of said drawbar.

15. The assembly of claim 14 wherein said second member further comprises a cavity wherein said means to prevent said second member is concealed in said cavity.

16. The assembly of claim 14 wherein said second member comprises means to resist rotation relative to said drawbar.

17. The assembly of claim 7 further comprising a housing external to said drawbar member which incorporates a hole generally aligned with the hole in said drawbar end portion.

18. The assembly of claim 1 wherein the rotation of said handle about the drawbar axis causes the drawbar to rotate with the handle.

19. The assembly of claim 1 wherein the rotation of said handle about the drawbar axis does not cause the drawbar to rotate with the handle.

20. An assembly for fixing a wheel to wheel mounts used in connection with a hub and a hollow axle comprising; a handle, and a drawbar, said drawbar mounted concentrically in said hollow axle and having a first end and a second end, said handle mounted to said first end of said drawbar, said second end configured with a second member, wherein said first end of said drawbar has an end portion with a hole positioned at a generally right angle to said drawbar axis, said handle further comprises means to resist but not prevent pivoting about said hole,
wherein primary clamping of the wheel mounts to the wheel is effectuated by the rotation of said handle around the drawbar axis relative to said second member and wherein after primary clamping is completed, said handle is configured for repositioning relative to said drawbar by movement in a direction other than longitudinally along said drawbar's axis to allow for the repositioning of said handle to a position desired during the usage of said wheel.

21. An assembly for fixing a wheel to wheel mounts used in connection with a hub and a hollow axle comprising; a handle, and a drawbar, said drawbar mounted concentrically in said hollow axle and having a first end and a second end, wherein said first end of said drawbar has an end portion with a hole positioned at a generally right angle to said drawbar axis, said second end configured with a second member, said handle mounted to said first end of said drawbar, wherein said handle has a cutout to accommodate said end portion of said drawbar and a through hole aligned with said hole in said end portion, a mounting pin passing through said through hole and said hole, a friction washer mounted on said pin and inside said cutout to resist articulation of said handle wherein primary clamping of the wheel mounts to the wheel is effectuated by the rotation of said handle around the drawbar axis relative to said second member and wherein after primary clamping is completed, said handle is configured for repositioning relative to said drawbar by movement in a direction other than longitudinally along said drawbar's axis to allow for the repositioning of said handle to a position desired during the usage of said wheel.

* * * * *